United States Patent
Lobo et al.

(10) Patent No.: US 11,921,648 B1
(45) Date of Patent: Mar. 5, 2024

(54) STATISTIC-BASED ADAPTIVE POLLING DRIVER

(71) Applicant: NetScout Systems Texas, LLC, Plano, TX (US)

(72) Inventors: Danny Lobo, Pleasanton, CA (US); Suhas Bhanushali, Westford, MA (US); Russell Erikson, Portola Valley, CA (US); Edward Charles Lombardo, Salem, NH (US); Michael Volante, Groton, MA (US)

(73) Assignee: Netscout Systems Texas, LLC, Plano, TX (US)

( * ) Notice: Subject to any disclaimer, the term of this patent is extended or adjusted under 35 U.S.C. 154(b) by 0 days.

(21) Appl. No.: 17/958,810

(22) Filed: Oct. 3, 2022

(51) Int. Cl.
*H04L 41/5019* (2022.01)
*G06F 13/12* (2006.01)
*H04L 49/9047* (2022.01)

(52) U.S. Cl.
CPC ........ *G06F 13/128* (2013.01); *H04L 49/9047* (2013.01)

(58) Field of Classification Search
CPC .............. G06F 13/128; G06F 15/1735; H04L 49/9047; H04L 49/30
See application file for complete search history.

(56) References Cited

U.S. PATENT DOCUMENTS

| | | | |
|---|---|---|---|
| 2016/0378545 A1* | 12/2016 | Ho | G06F 11/302 718/107 |
| 2017/0124327 A1* | 5/2017 | Kumbhar | G06F 21/566 |
| 2019/0306282 A1* | 10/2019 | Masputra | G06F 9/4881 |
| 2021/0099391 A1* | 4/2021 | Masputra | H04L 47/805 |
| 2021/0391950 A1* | 12/2021 | Paasch | H04L 69/161 |
| 2022/0083388 A1* | 3/2022 | Masputra | G06F 15/1735 |
| 2022/0094763 A1* | 3/2022 | Masputra | H04L 69/16 |
| 2023/0328310 A1* | 10/2023 | Jain | H04N 21/43637 725/126 |

* cited by examiner

*Primary Examiner* — Abdelnabi O Musa
(74) *Attorney, Agent, or Firm* — Foley & Lardner LLP

(57) ABSTRACT

A processor having kernel space and user space and a method is provided. The method includes receiving in the user space at least one interface statistic about each hardware interface of one or more hardware interfaces receiving packets, wherein the at least one interface statistic is provided from the hardware interface. The method further includes dynamically adjusting, from within the user space, a priority at which each of the one or more hardware interfaces is polled as a function of the at least one interface statistic.

22 Claims, 11 Drawing Sheets

Scheduler Flowchart (Throughput-State "2")

Scheduler Flowchart (Throughput-State "4")

Maximize Priority Flow

Adjust Priority Flowchart

Increase Priority Flowchart

Decrease Priority Flowchart

STATISTIC-BASED ADAPTIVE POLLING DRIVER

FIELD OF THE DISCLOSURE

The disclosed embodiments generally relate to processing incoming data in a computing system, and more particularly to a system and method for adaptive statistic-based polling interfaces at which data is received by the computing system.

BACKGROUND OF THE DISCLOSURE

In order to accommodate the ever-increasing need for processing power, a high-end computing system may be provided with an increased number of cores per central processing unit (CPU). As application features increase, the number of threads running on available cores can increase as well, resulting in a decreased number of cores available per thread.

The polling driver can run continuously, such as by polling all interfaces for available packets in a round-robin fashion. The constant polling can waste CPU resources when only a small amount of traffic is being received by the NIC. A CPU core can be busy to its capacity while doing nothing but polling. When there are many cores available that can process even more than would be needed by the application(s) running on the computing system, the cost of dedicating one or more cores to polling may be acceptable.

However, this may not be the case in a low-end computing system in which there are only a small number of cores per CPU. It may not be acceptable for a low-end computing system to dedicate an entire core (or multiple cores) to be used for polling purposes.

Waste can occur in high-end or low-end computing systems. In a high-end computing system servicing many network interfaces and/or servicing high-speed network interfaces. While multiple poll threads can be used to accommodate a high receive traffic throughput, the processing power of the CPU core(s) which are running these poll threads may be unused during time intervals when the receive traffic throughput is low. This poses a risk of the unused processing capability, albeit abundant, being wasted. In a low-end computing system, an application being executed may only generate a limited network traffic, using only a fraction of the processing power available in a single core. This poses a risk of the unused processing capability, which is already limited, being wasted. Furthermore, when a system has multiple network interfaces or ports, each interface can have its own queue of received packets, with each queue being polled by a polling driver for available receive packets. When the polling driver checks each interface in turn, one after the other, the polling itself can be more than is needed, and can thus be wasteful.

Conventional methods and systems have generally been considered satisfactory for their intended purpose. However, there is still a need in the art to efficiently maximize utilization of available processing power, optimize use of available cores, and minimize wasted CPU cycles due to idleness or performance of unnecessary tasks, including excess polling of interfaces.

SUMMARY

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method implemented in a processor having kernel space and user space is provided. The method receiving in the user space at least one interface statistic about each hardware interface of one or more hardware interfaces receiving packets, wherein the at least one interface statistic is provided from the hardware interface. The method further includes dynamically adjusting, from within the user space, a priority at which each of the one or more hardware interfaces is polled as a function of the at least one interface statistic.

In one or more embodiments, dynamically adjusting the priority for a particular hardware interface of the one or more hardware interfaces can include changing between states of a state machine, including entering and remaining in a drop state while a dropped packet condition is detected and checking only for dropped packets while in the drop state.

In one or more embodiments, the priority of the hardware interface can be maximized when entering the drop state.

In one or more embodiments, changing between states of the state machine can further include entering and remaining in a receive (Rx) buffer filled state while a Rx buffer filled condition is detected and a dropped packet condition is not detected for the hardware interface, wherein the Rx buffer filled condition can be a function of fill status of a Rx buffer in the hardware interface as reported to the kernel space. The method can further include checking only for the dropped packet condition and the Rx buffer filled condition while in the Rx buffer filled state.

In one or more embodiments, while the Rx buffer filled condition is detected for the hardware interface, the priority of the hardware interface can be adjusted based on a calculated interval packet rate of the hardware interface.

In one or more embodiments, changing between states of the state machine further can include entering and remaining in an Rx driver queue filled state while a Rx driver queue filled condition is detected and Rx buffer filled and dropped packet conditions are not detected for the hardware interface, wherein the Rx driver queue filled condition can be a function of fill status of a receive queue established by DMA transfer from the hardware interface. The method can further include checking for the dropped packet condition and the Rx driver queue filled condition while in the Rx buffer filled state.

In one or more embodiments, checking for the dropped packet condition can be performed before checking for the Rx driver queue filled condition, and/or while the Rx driver queue filled condition is detected for the hardware interface, the priority of the hardware interface can be adjusted based on a calculated interval packet rate of the hardware interface.

In one or more embodiments, changing between states of the state machine further can include entering and remaining in a packet receiving state when the hardware interface is receiving packets and Rx driver queue filled, Rx buffer filled, and dropped packet conditions are not detected for the hardware interface, wherein while in the packet receiving state, the priority of the hardware interface can be adjusted based on a calculated interval packet rate of the hardware interface.

In one or more embodiments, checking for the dropped packet condition can be performed before checking for the Rx buffer filled condition, and checking for the Rx buffer filled condition can be performed before checking for the Rx driver queue filled condition, and/or the priority can be increased or decreased when changing to the Rx buffer filled state or the Rx driver queue filled state and the priority can be maximized when changing to the drop state.

In one or more embodiments, changing between states of the state machine further can include entering and remaining in an idle state when the hardware interface is not receiving packets, wherein the idle state can include refraining from monitoring for Rx driver queue filled, Rx buffer filled, and dropped packet conditions.

In one or more embodiments, adjusting the priority can include maximizing the priority when a dropped packet condition is detected, and maximizing the priority can include maximizing a polling rate for polling the hardware interface, maximizing a nice value associated with the hardware interface, and maximizing a number of poll threads to allocate for the hardware interface, or adjusting the priority when Rx driver queue filled or Rx buffer filled conditions are detected, wherein adjusting the priority can include activating or deactivating one or more poll threads for the hardware interface, increasing or decreasing a nice value associated with the hardware interface, and increasing or decreasing a polling rate for polling the hardware interface.

In accordance with a further aspect of the disclosure, a processor having kernel space and user space and a polling engine in the user space is provided. The polling engine includes at least one memory configured to store instructions and at least one processing device disposed in communication with the at least one memory. The at least one processing device upon execution of the instructions is configured to receive at least one interface statistic about each hardware interface of one or more hardware interfaces receiving packets, wherein the at least one interface statistic is provided from the hardware interface. The at least one processing device upon execution of the instructions is further configured to dynamically adjust, from within the user space, a priority at which each of the one or more hardware interfaces is polled as a function of the at least one interface statistic.

In one or more embodiments, the at least one processing device upon execution of the instructions can be further configured to dynamically adjust the priority for a particular hardware interface of the one or more hardware interfaces by changing between states of a state machine, including entering and remaining in a drop state while a dropped packet condition is detected and checking only for dropped packets while in the drop state.

In one or more embodiments, the priority of the hardware interface can be maximized when entering the drop state.

In one or more embodiments, the at least one processing device upon execution of the instructions can be further configured to change between states of the state machine by entering and remaining in a receive (Rx) buffer filled state while a Rx buffer filled condition is detected and a dropped packet condition is not detected for the hardware interface, wherein the Rx buffer filled condition can be a function of fill status of a Rx buffer in the hardware interface as reported to the kernel space, and checking only for the dropped packet condition and the Rx buffer filled condition while in the Rx buffer filled state.

In one or more embodiments, while the Rx buffer filled condition is detected for the hardware interface, the at least one processing device upon execution of the instructions can be further configured to adjust priority of the hardware interface based on a calculated interval packet rate of the hardware interface.

In one or more embodiments, the at least one processing device upon execution of the instructions can be further configured to change between states of the state machine by entering and remaining in an Rx driver queue filled state while a Rx driver queue filled condition is detected and Rx buffer filled and dropped packet conditions are not detected for the hardware interface, wherein the Rx driver queue filled condition can be a function of fill status of a receive queue established by DMA transfer from the hardware interface, and checking for the dropped packet condition and the Rx driver queue filled condition while in the Rx buffer filled state.

In one or more embodiments, the at least one processing device upon execution of the instructions can be further configured to check for the dropped packet condition before checking for the Rx driver queue filled condition, and/or while the Rx driver queue filled condition is detected for the hardware interface, the at least one processing device upon execution of the instructions can be further configured to adjust priority of the hardware interface based on a calculated interval packet rate of the hardware interface.

In one or more embodiments, the at least one processing device upon execution of the instructions can be further configured to change between states of the state machine further by entering and remaining in a packet receiving state when the hardware interface is receiving packets and Rx driver queue filled, Rx buffer filled, and dropped packet conditions are not detected for the hardware interface, wherein while in the packet receiving state, the at least one processing device upon execution of the instructions can be further configured to adjust priority of the hardware interface based on a calculated interval packet rate of the hardware interface.

In one or more embodiments, the at least one processing device upon execution of the instructions can be further configured to check for the dropped packet condition before checking for the Rx buffer filled condition, and to check for the Rx buffer filled condition before checking for the Rx driver queue filled condition, and/or the at least one processing device upon execution of the instructions can be further configured to increase or decrease the priority when changing to the Rx buffer filled state or the Rx driver queue filled state and to maximize the priority when changing to the drop state.

In one or more embodiments, the at least one processing device upon execution of the instructions can be further configured to change between states of the state machine further by entering and remaining in an idle state when the hardware interface is not receiving packets, wherein the idle state can include refraining from monitoring for Rx driver queue filled, Rx buffer filled, and dropped packet conditions.

In one or more embodiments, the at least one processing device upon execution of the instructions can be further configured to adjust the priority by maximizing the priority when a dropped packet condition is detected, and maximizing the priority can include maximizing a polling rate for polling the hardware interface, maximizing a nice value associated with the hardware interface, and maximizing a number of poll threads to allocate for the hardware interface; or adjusting the priority when Rx driver queue filled or Rx buffer filled conditions are detected, wherein adjusting the priority can include activating or deactivating one or more poll threads for the hardware interface, increasing or decreasing a nice value associated with the hardware interface, and increasing or decreasing a polling rate for polling the hardware interface.

In accordance with still further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

An adaptive polling driver is provided that executes in user space of a computing system to monitor a hardware interface and adjust its priority based on a receive traffic throughput of the hardware interface as indicated by statistics provided by the hardware interface. The adaptive polling driver includes a scheduler that changes states (referred to as throughput states) based on monitored receive traffic throughput. The scheduler can apply a hierarchy of checks for monitoring the hardware interface by changing throughput states. The scheduler can first apply a simplest check (in a drop state) to detect dropped packets, followed by the next simplest check (in a receive (Rx) first in first out (FIFO) buffer filled state) to detect an Rx buffer filled condition in the hardware interface itself, followed by a more complex check (in an Rx driver queue filled state) to detect an Rx driver queue filled condition. By maintaining a throughput state for each interface, the scheduler can determine appropriate adjustments to use for a next polling cycle, based on any changes to the throughput state in the current polling cycle from a previous polling cycle. This hierarchy simplifies complexity of monitoring the hardware interfaces for adjusting priority assigned to the hardware interfaces and allows monitoring to be idle (in an idle state) when no packets are received. The adjusted priority optimizes usage of allocated core(s) by the hardware interfaces and allows unused portions of the cores to be available for other tasks in the computing system.

The scheduler thus prioritizes which hardware interfaces to poll and frequency of polling per hardware interface, wherein the prioritization uses simple tasks before more complex tasks.

Figure 1:
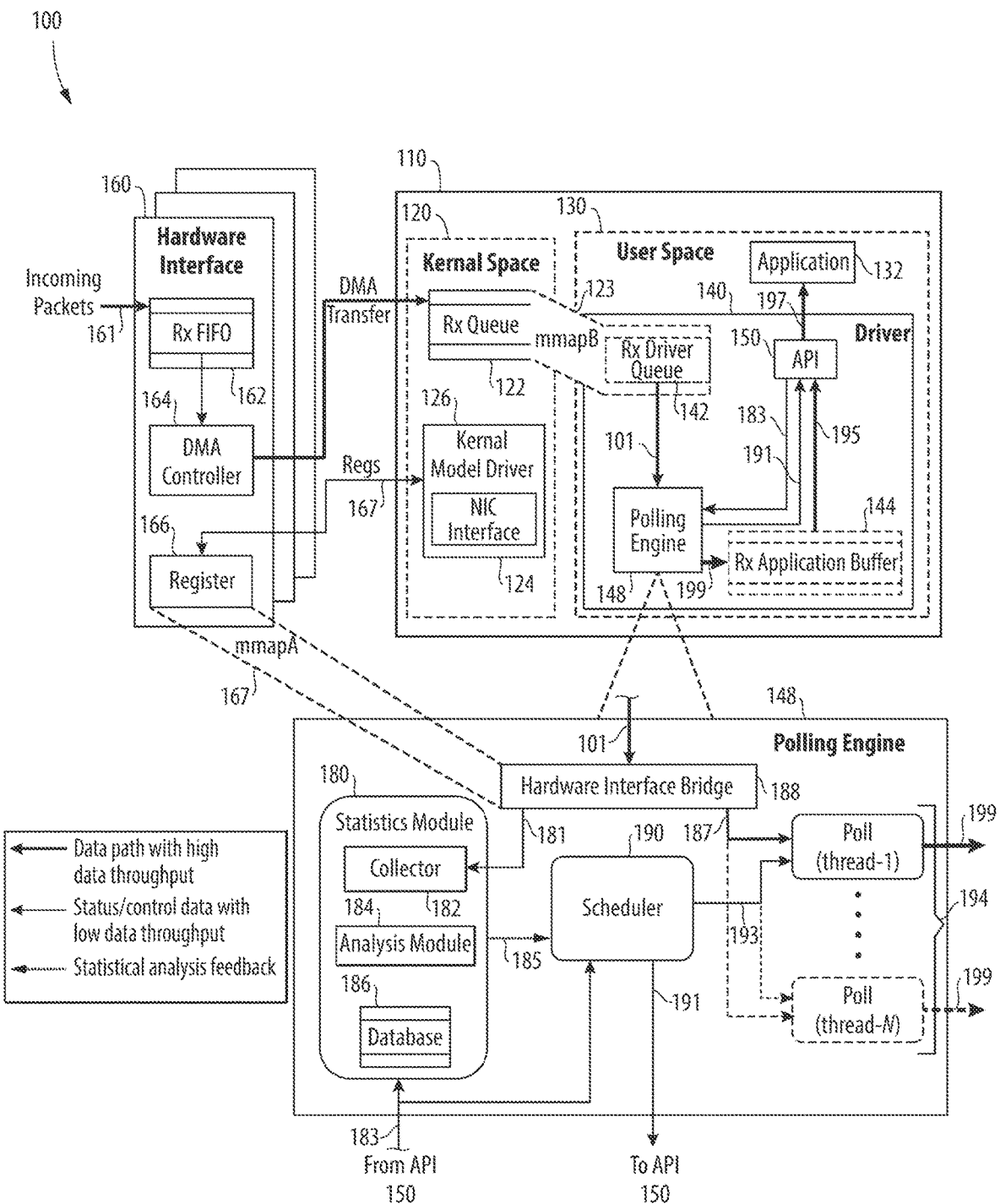
FIG. 1 illustrates a block diagram of an example computing system with an expanded view of the computing system's polling engine, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a computing system in accordance with the disclosure is shown in FIG. 1 and is designated generally by reference character 100. Other embodiments of the computing system 100 in accordance with the disclosure, or aspects thereof, are provided in FIGS. 2-11, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the computing system 100 is provided. Computing system 100 includes one or more hardware interfaces 160, such as a network interface controller (NIC), and a host server 110. Hardware interface 160 includes an RX buffer 162 (e.g., a first-in-first-out (FIFO)) buffer, a direct memory access (DMA) controller 164, and registers 166.

Figure 11:
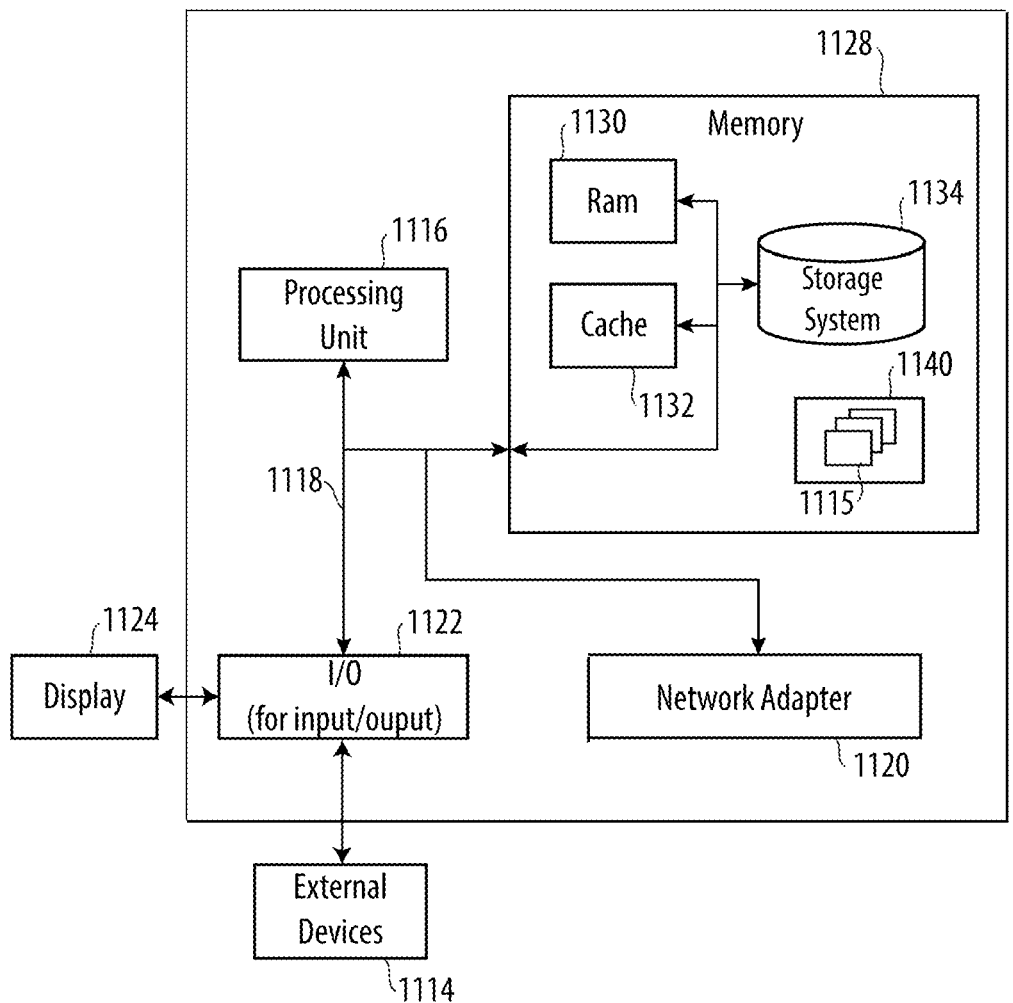
FIG. 11 illustrates an example computer system that could be used to implement the computing system shown in FIG. 1.

Host server 110 includes a kernel space 120 and a user space 130. Kernel space 120 includes, for example, an Rx queue 122 and a kernel-mode driver 126 having a NIC interface for interfacing with hardware interface 160. User space 130 includes, for example, an application 132 and an adaptive polling driver 140. Rx queue 122 is stored in memory, e.g., random access memory (RAM) of computing system 100, and kernel-mode driver 126, adaptive polling driver 140, and application 132 are configured to execute on one or more processing devices of computing system 100. Memory and processing devices of computing system 100 are depicted in FIG. 11, which shows an example architecture of computing system 100.

Hardware interface 160 receives incoming packets for the computing system 100 at port 161, which are stored in RX buffer 162 and transferred via DMA by DMA controller 164 to Rx queue 122. Registers and kernel-mode driver 126 exchange information at data path 167 for handshaking purposes and for providing statistics about hardware interface 160 to kernel-mode driver 126. In addition, statistics stored in registers 166 are memory mapped by a first memory mapping process shown as mmapA 167 to memory used by adaptive polling driver 140 via hardware interface bridge 188. Transfer of information from hardware interface 160 can include identification of the hardware interface, particularly when more than one hardware interface 160 receives incoming packets to computing system 100.

Adaptive polling driver 140 includes a mapped (or virtual) Rx driver queue 142 to which data from Rx queue 122 is memory mapped (mmap) by a second memory mapping process mmapB 123, a polling engine 148, an application programmable interface (API), and an Rx application buffer 144. Polling engine 148 and API 150 include programmable code that are executable by one or more processing devices of computing system 100. Rx driver queue 142, RX application buffer 144, and buffers used by polling engine 148 are stored in memory of, and/or accessible by, computing system 100.

An expanded view of polling engine 148 is shown with additional components, including hardware interface bridge 188, statistics module 180, scheduler 190, and activated poll threads 194. Statistics from registers 166 are memory mapped (as shown at mmapA 167) to poll engine 148. In particular, the memory mapped statistics are obtained by interface bridge 188 and stored in collector 182 via arrow 181. These statistics include, for example, a count of dropped packets, a count of packets received at port 161, and Rx buffer fill level. Collector 182 is a buffer that stores statistics data for one polling cycle. Database 186 is used to store statistics received by collector 182, e.g., in persistent storage.

Analysis module 184 obtains the statistics per polling cycle from collector 182 and detects changes relative to a previous polling cycle, such as the immediately previous polling cycle. Statistics about the previous polling cycle can be stored in database 186 and accessed by analysis module 184. Analysis results are provided from analysis module 184 to scheduler 190. Scheduler 190 is configured to implement a state machine that processes results from analysis module 184 and adjusts priority assigned to the hardware interface.

At arrow 183, a path is shown, from API 150 to polling engine 148, for providing configuration data from the API 150 to statistics module 180 and/or scheduler 190. The configuration data includes, for example, a number of ports being used, a maximum number of poll threads allowed, minimum and/or maximum polling intervals, etc. This configuration data is used to configure collector 182 to collect specific statistics and for analysis module 184 to analyze the collected data and store it in database 186 as specified. Status data is provided by scheduler 190 along the data path indicated by arrow 191 (from polling engine 148 to API 150) to provide at least status information. The status information includes, for example, dropped packet counts, total packet counts, general traffic statistics, number of active polling threads, and/or idle time of threads. The status information can be passed by API 150 to application 132 and then to the user. At arrow 185, a path is shown for providing output from analysis module 184 to scheduler 190, as described in greater detail below.

Arrow 187 indicates paths for providing the Rx data from hardware interface bridge 188 to active poll threads (thread-1-thread-M. This Rx data was memory mapped, by the second memory mapping process mmapB 123, from Rx Queue 122 and transferred along the path shown by arrow 101 to polling engine 148, and by polling engine 148 to Rx application buffer 144 via the path shown by arrow 199. Rx application buffer 144 is available for use by application 132. Data can be provided from Rx application buffer 144 to API 150 API 150 via a data path shown by arrow 195, and from API 150 to application 132 via a data path shown by arrow 197.

Rx data provided along the paths indicated by arrows 187 are processed by one of the poll threads 194 that is selected by a poll control signal passed along the paths indicated by arrows 193. The poll control signal is output by scheduler 190 and provided to poll threads 194.

The priorities of the active poll threads (thread-1-thread-N) are increased or decreased based on control signals delivered along path 193. The setting and adjustment of the priorities of the poll threads is described with respect to FIGS. 2-10. Raising a priority for a poll thread can cause the poll thread to use an increased number of poll threads and to decrease an interval between poll cycles. Similarly, decreasing a priority for a poll thread can cause the poll thread to use a decreased number of poll threads and to increase the interval between poll cycles.

Host server 110 can be implemented as one or more physical and/or virtual devices that use a local or remote processing device having hardware or firmware that executes software instructions, which enables performance of the disclosed functions. The functionality of host server 110 can be retrofitted to an existing host server. Additionally, the components of host server 110 can share one or more hardware, firmware, and/or software components.

In operation, scheduler 190 receives information from analysis module 184 about a particular hardware interface 160. The information can include whether there is a change relative to a previous polling cycle regarding whether packets are being received or not at port 161 of the particular hardware interface 160, whether packets received at port 161 of the particular hardware interface 160 are being dropped or not, satisfaction of a Rx buffer filled condition as a function of fill level of the particular hardware interface's 160 Rx buffer 162, and/or satisfaction of a Rx driver queue filled condition for the particular hardware interface 160 as a function of fill level of the Rx driver queue 142. This information is based on statistics provided by the hardware interface 160 by mmapping to hardware interface bridge 188. These statistics are temporarily stored by collector 182.

The statistics can be received from hardware interface 160 and analyzed by adaptive polling driver 140 in real time. Real time in this application means that adaptive polling driver 140 can analyze and respond to received statistics within its current polling cycle, or within the immediately subsequent polling cycle. Additionally, adaptive polling driver 140 can continuously monitor, per polling cycle, receive traffic throughput for each hardware interface 160 of one or more multiple hardware interfaces 160.

The state machine of scheduler 190 can transition between throughput states, initially starting in an idle state (0) before incoming packets are received at port 161. Once packets are received, the state machine can transition to a packet receiving state (1), a Rx driver queue filled state (2), an Rx buffer filled state (3), a drop state (4), and the idle state (0). Table 1 lists the states and their definitions.

TABLE 1

Scheduler Throughput States
Throughput States

| State | Definition |
| --- | --- |
| 0 | Initial scheduler state from start-up<br>Port is not receiving any packets (idle state) |
| 1 | Port is NOT dropping packets<br>Rx buffer fill threshold has NOT been triggered<br>Rx driver queue fill threshold has NOT been triggered |
| 2 | Port is NOT dropping packets<br>Rx buffer fill threshold has NOT been triggered<br>Rx driver queue fill threshold has been triggered<br>(State 2 can have multiple levels of priority based on different fill levels of the RX driver queue) |
| 3 | Port is NOT dropping packets<br>Rx buffer fill threshold has been triggered |
| 4 | Port is dropping packets |

The state machine initializes in and remains in the idle state when hardware interface 160 is not receiving any packets. When in the idle state, there is no need for analysis to monitor for other conditions other than receiving a packet. This frees one or more of hardware interface bridge 188, and statistics module 180 from gathering and/or monitoring statistics related to Rx driver queue filled, Rx buffer filled, and dropped packet conditions. Upon initialization a bare minimum of poll threads are allocated for the hardware interface as only minimal polling is needed of the hardware interface. The bare minimum can be one poll thread.

Scheduler 190 enters and remains in the packet receiving state when hardware interface 160 begins receiving packets and as long as Rx driver queue filled, Rx buffer filled, and dropped packet conditions are not detected for the hardware interface. In one or more embodiments, simpler monitoring tasks are performed before more complex monitoring tasks. For example, checking for the dropped packet condition is performed before checking for the Rx buffer filled condition, and checking for the Rx buffer filled condition is performed before checking for the Rx driver queue filled condition. The dropped packet condition occurs, for example, when a number of detected dropped packets exceeds a dropped packet threshold. This condition can require a trend or that dropped packets be within a particular time window or within a particular pattern, e.g., of consecutive and/or spaced apart polling cycles. When the dropped packet condition is detected scheduler 190 transitions to the drop state (or remains in the drop state if already there). In one or more embodiments, the dropped packet condition is triggered upon detection of a single dropped packet.

The Rx buffer filled condition occurs when a fill status of Rx buffer 162 of hardware interface 160 exceeds a predetermined Rx buffer fill threshold. Small variations in the Rx buffer fill level can be ignored by only triggering the Rx buffer filled condition when the Rx buffer fill threshold is exceeded. When the Rx buffer filled condition is detected, scheduler 190 transitions to the Rx buffer filled state (or remains in the Rx buffer filled state if already there).

The Rx driver queue filled condition occurs when a fill status of Rx driver queue 142 exceeds a predetermined RX driver queue fill threshold. Small variations in the Rx driver queue fill level can be ignored by only triggering the Rx driver queue filled condition when the Rx driver queue fill threshold is exceeded. The fill status of Rx driver queue 142 is a function of fill status of Rx queue 122 in kernel space 120 as established by DMA transfer from hardware interface 160. When the Rx driver queue filled condition is detected, scheduler 190 transitions to the Rx driver queue filled state (or remains in the Rx driver queue filled state if already there).

The state of the state machine changes to the drop state when the dropped packet condition is detected, and changes to the Rx buffer filled state when the Rx buffer filled condition is detected, and changes to the Rx driver queue filled state when the Rx driver queue filled condition is detected. The priority is maximized when changing to the drop state, and the priority is increased or decreased when changing to the Rx buffer filled state or the Rx driver queue filled state. In one or more embodiments, increasing or decreasing the priority can be based on a calculated interval packet rate of hardware interface 160. The term "interval packet rate" refers to the packet rate calculated for the time interval that includes the previous polling cycle. The size of the polling interval (namely the time from the beginning to end of a polling cycle) is inversely proportional to the interval packet rate. In addition, while in the packet receiving state, the priority can be adjusted (increased or decreased) as a function of an interval packet rate calculated for the current polling cycle.

In one or more embodiments, maximizing the priority can include one or more actions of maximizing a polling rate for polling the hardware interface, maximizing a nice value associated with the hardware interface, and maximizing a number of poll threads to allocate for the hardware interface. In one or more embodiments, increasing or decreasing the priority can include one or more actions of activating or deactivating one or more poll threads for the hardware interface, increasing or decreasing a nice value associated with the hardware interface, and increasing or decreasing a polling rate for polling the hardware interface.

Scheduler 190 enters and remains in the Rx driver queue filled state while an Rx driver queue filled condition is detected and Rx buffer filled and dropped packet condition is not detected for hardware interface 160. In one or more embodiments, in order to perform the simpler monitoring tasks before more complex monitoring tasks, checking for the dropped packet condition is performed before checking for the Rx buffer filled condition, and checking for the Rx buffer filled condition is performed before checking if the Rx driver queue filled condition still exists.

The state of the state machine changes to the drop state when the dropped packet condition is detected (along with maximizing priority), and changes to the Rx buffer filled state when the Rx buffer filled condition is detected (along with adjusting priority), and stays in the Rx driver queue filled state as long as the Rx driver queue filled condition is detected (along with adjusting priority). If the Rx driver queue filled condition is no longer detected the scheduler 190 changes to the packet receiving state.

Scheduler 190 enters and remains in the Rx buffer filled state while an Rx buffer filled condition is detected and a dropped packet condition is not detected for hardware interface 160. In one or more embodiments, in order to perform the simpler monitoring tasks before more complex monitoring tasks, checking for the dropped packet condition is performed before checking for the Rx buffer filled condition.

The state of the state machine changes to the drop state when the dropped packet condition is detected (along with maximizing priority). If the Rx buffer filled state is no longer detected, the scheduler 190 changes to the Rx driver queue filled state.

Scheduler 190 enters and remains in the drop state while a dropped packet condition is detected. If the drop state is no longer detected, the scheduler 190 changes to the Rx buffer filled state.

With reference now to FIGS. 2-10, shown are flowcharts demonstrating implementation of the various exemplary embodiments. It is noted that the order of operations shown in FIGS. 2-10 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

FIGS. 2-6 show a method performed by a state machine of a scheduler, such as scheduler 190, monitoring a particular hardware interface, such as hardware interface 160 as shown in FIG. 1. The method can be performed for multiple hardware interfaces to adaptively control polling on each of the hardware interfaces in accordance with statistics associated with the corresponding hardware interface.

Figure 2:
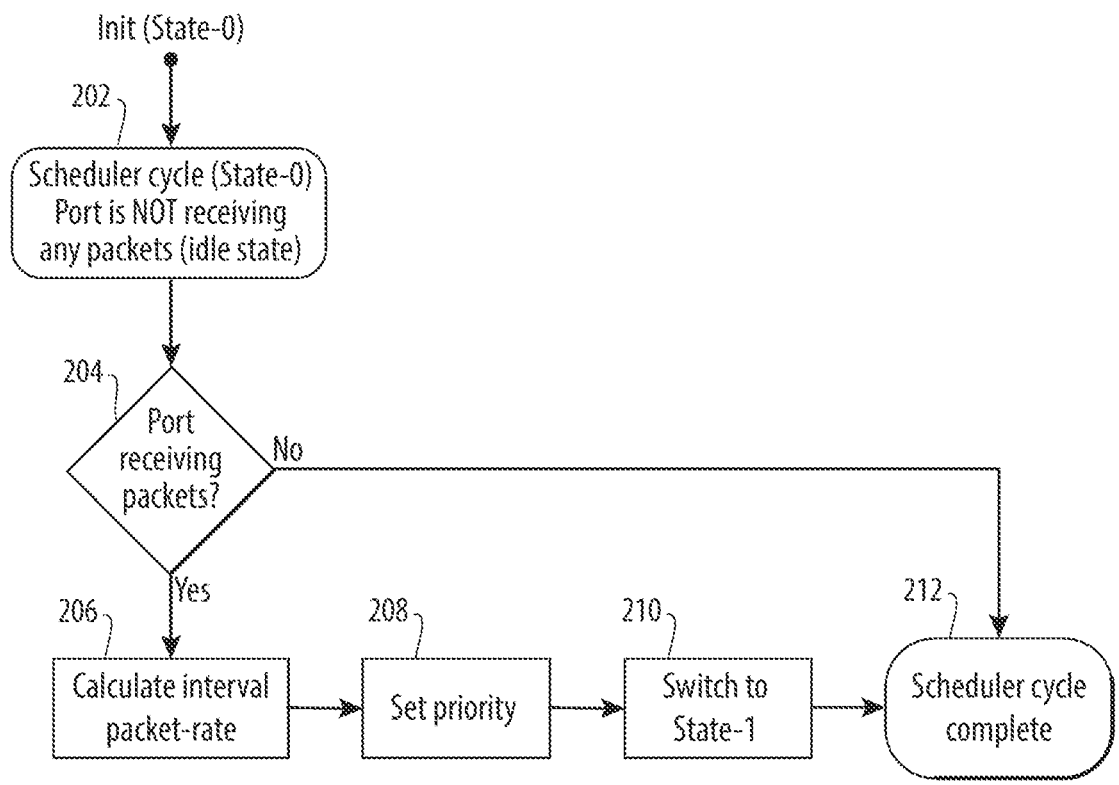
FIG. 2 is a flowchart showing an example method performed by a scheduler of the polling engine shown in FIG. 1 when operating in an idle state, in accordance with an aspect of the disclosure.

FIG. 2 shows a method performed by the scheduler when operating in the idle state (0). The idle state is entered at block 202, such as upon initialization. At decision block 204, a determination is made whether a port (e.g., port 161 shown in FIG. 1) of the hardware interface is receiving packets. If the determination at block 204 is NO, packets are not being received, the scheduler cycle is completed at block 212. If the determination at block 204 is YES, meaning packets are being received, the method continues at block 206 at which point an interval packet rate is calculated. At block 208 priority is set, and at block 210 the throughput state is switched to the next throughput state in accordance with the hierarchy of throughput states, which in the example shown is the packet receiving state (1).

Figure 3:
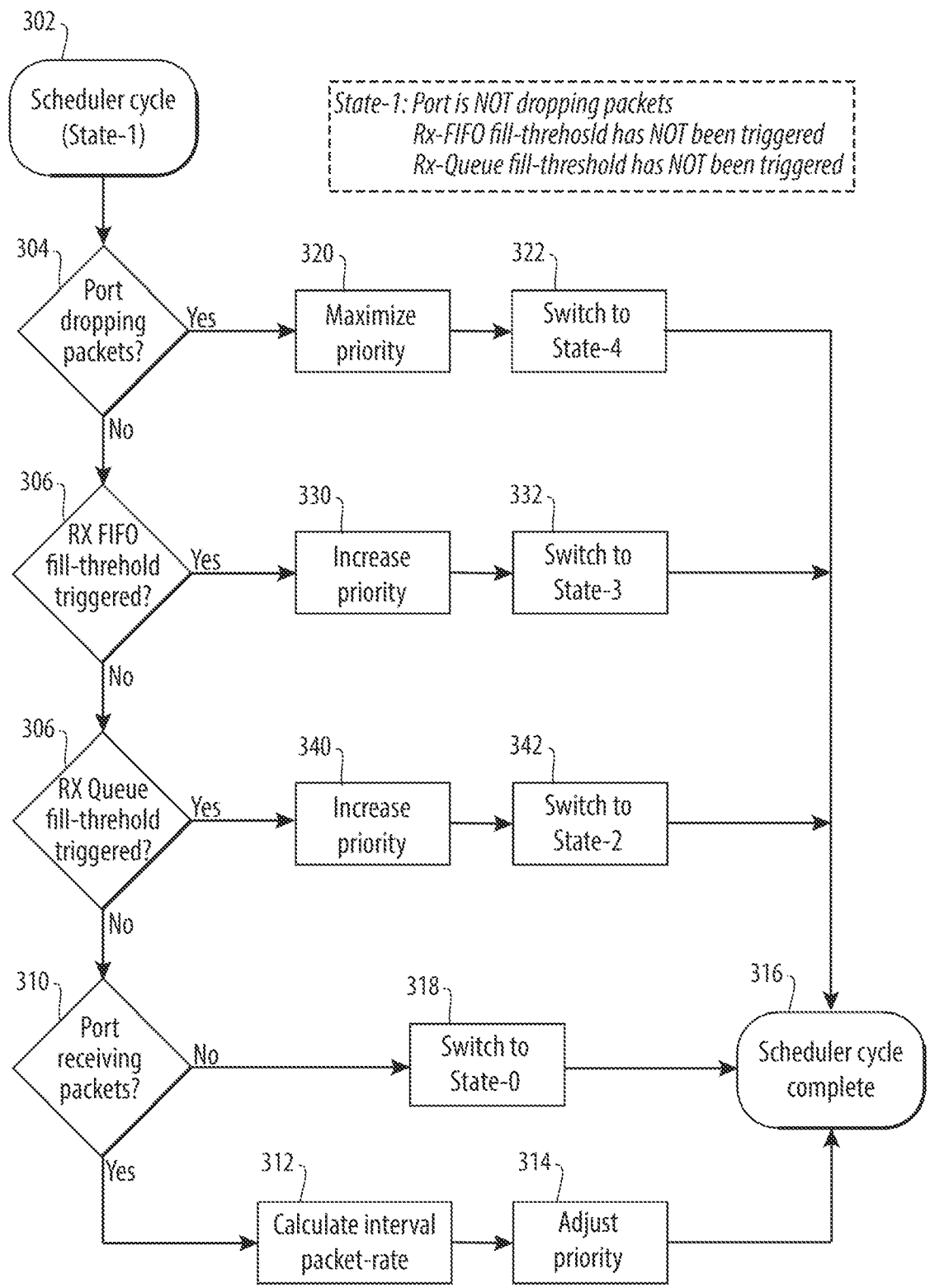
FIG. 3 is a flowchart showing an example method performed by the scheduler when operating in a packet receiving state, in accordance with an aspect of the disclosure.

FIG. 3 shows a method performed by the scheduler when operating in the packet receiving state (1). The packet receiving state is entered at block 302, such as after an idle period. At decision block 304, a determination is made whether packets are being dropped at the port of the hardware interface. If the determination at block 304 is NO, the method continues at decision block 306. At decision block 306, a determination is made whether the Rx buffer filled condition has been triggered. If the determination at block 306 is NO, the method continues at decision block 308. At decision block 308, a determination is made whether the Rx device queue filled condition has been triggered. If the determination at block 308 is NO, the method continues at decision block 310. At decision block 310, a determination is made whether packets are still being received at the port of the hardware interface. If the determination at block 310 is YES, the scheduler remains in the packet receiving state (1). Rather, at block 312 a packet rate for the current polling cycle is calculated. At block 314 priority of the hardware interface is adjusted based on the packet rate calculated for the time interval that includes the previous polling cycle, after which the scheduler's cycle is completed at block 316. If the determination at block 310 was NO, meaning packets are no longer being received at the port, the method continues at block 318 for switching back to the previous throughput state in accordance with the hierarchy of throughput states, which in the example shown is idle state (0), after which the scheduler's cycle is completed at block 316.

If the determination at block 304 was YES, meaning packets are being dropped at the port, the method continues at block 320 for maximizing priority, followed by block 322 for switching the state machine to the drop state (4), after which the scheduler's cycle is completed at block 316. If the determination at block 306 was YES, meaning the Rx buffer filled condition has been triggered, the method continues at block 330 for increasing priority, followed by block 332 for switching the state machine to the Rx buffer filled state (3), after which the scheduler's cycle is completed at block 316. If the determination at block 308 was YES, meaning the Rx device queue filled condition has been triggered, the method continues at block 340 for increasing priority, followed by block 342 for switching the state machine to the Rx driver queue filled state (2), after which the scheduler's cycle is completed at block 316.

Figure 4:
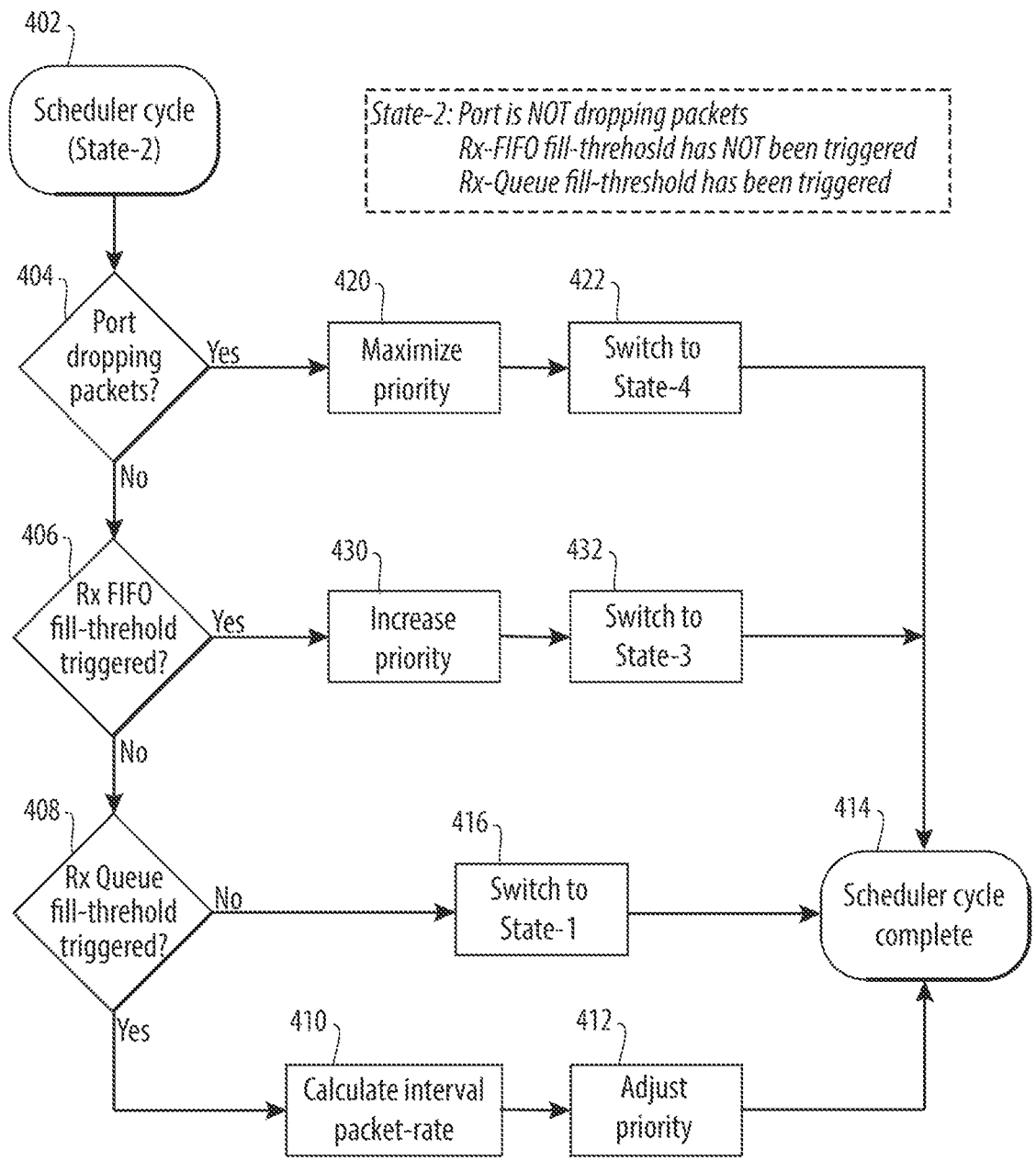
FIG. 4 is a flowchart showing an example method performed by the scheduler when operating in an Rx driver queue state, in accordance with an aspect of the disclosure.

FIG. 4 shows a method performed by the scheduler when operating in the Rx driver queue filled state (2). The Rx driver queue filled state is entered at block 402, such as after it was determined that the Rx driver queue filled condition was triggered. At decision block 404, a determination is made whether packets are being dropped at the port of the hardware interface. If the determination at block 404 is NO, the method continues at decision block 406. At decision block 406, a determination is made whether the Rx buffer filled condition has been triggered. If the determination at block 406 is NO, the method continues at decision block 408. At decision block 408, a determination is made whether the Rx device queue filled condition is still being triggered. If the determination at block 408 is YES, the scheduler remains in the Rx driver queue filled state (2). At block 410 a packet rate for the current polling cycle is calculated. At block 412 priority of the hardware interface is adjusted based on the packet rate calculated for the polling cycle, after which the scheduler's cycle is completed at block 414. If the determination at block 408 was NO, meaning the Rx driver queue filled condition is no longer triggered, the method continues at block 416 for switching back to the previous throughput state in accordance with the hierarchy of throughput states, which in the example shown is packet receiving state (1), after which the scheduler's cycle is completed at block 414.

If the determination at block 404 was YES, meaning packets are being dropped at the port, the method continues at block 420 for maximizing priority, followed by block 422 for switching the state machine to the drop state (4), after which the scheduler's cycle is completed at block 414. If the determination at block 406 was YES, meaning the Rx buffer filled condition has been triggered, the method continues at block 430 for increasing priority, followed by block 432 for switching the state machine to the Rx buffer filled state (3), after which the scheduler's cycle is completed at block 414.

Figure 5:
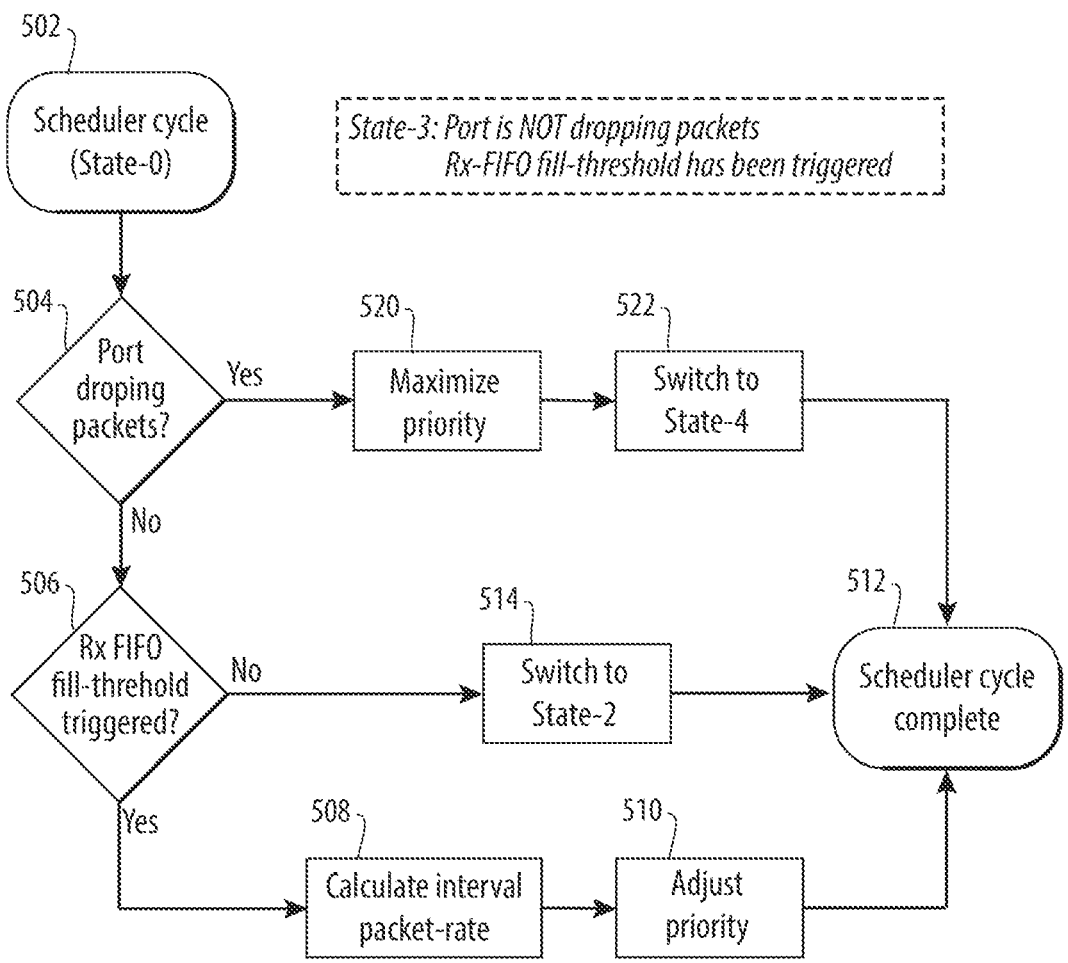
FIG. 5 is a flowchart showing an example method performed by the scheduler when operating in an Rx buffer filled state, in accordance with an aspect of the disclosure.

FIG. 5 shows a method performed by the scheduler when operating in the Rx buffer filled state (3). The Rx buffer filled state is entered at block 502, such as after it was determined that the Rx buffer filled condition was triggered. At decision block 504, a determination is made whether packets are being dropped at the port of the hardware interface. If the determination at block 504 is NO, the method continues at decision block 506. At decision block 506, a determination is made whether the Rx buffer filled condition has been triggered. If the determination at block 506 is YES, the scheduler remains in the Rx buffer filled state (3). At block 508 a packet rate for the current polling cycle is calculated. At block 510 priority of the hardware interface is adjusted based on the packet rate calculated for the polling cycle, after which the scheduler's cycle is completed at block 512. If the determination at block 506 was NO, meaning the Rx buffer filled condition is no longer triggered, the method continues at block 514 for switching back to the previous throughput state in accordance with the hierarchy of throughput states, which in the example shown is the Rx driver queue filled state (2), after which the scheduler's cycle is completed at block 512.

If the determination at block 504 was YES, meaning packets are being dropped at the port, the method continues at block 520 for maximizing priority, followed by block 522 for switching the state machine to the drop state (4), after which the scheduler's cycle is completed at block 512.

Figure 6:
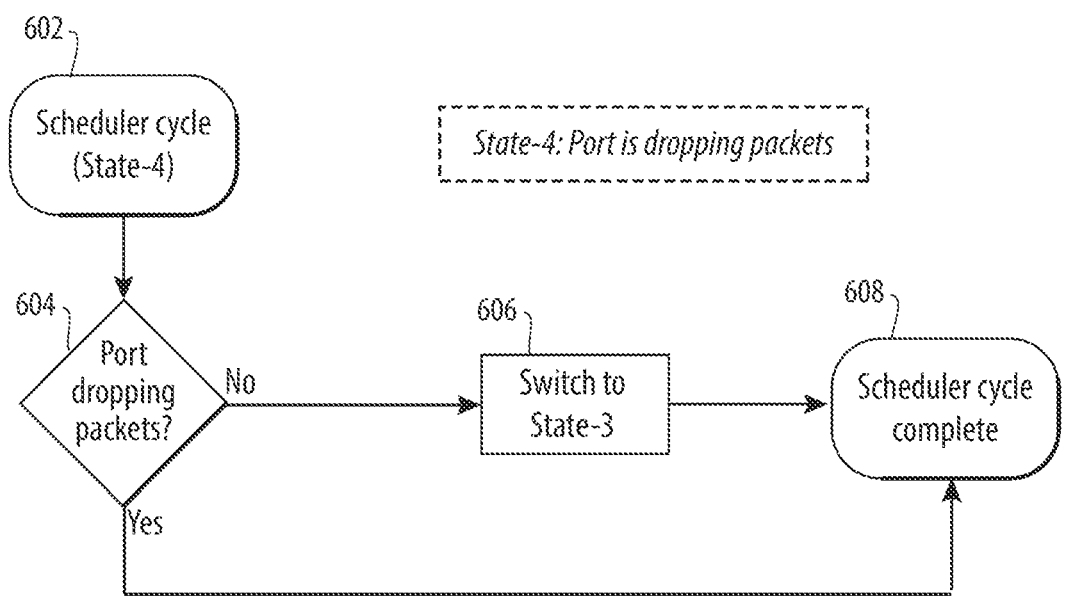
FIG. 6 is a flowchart showing an example method performed by the scheduler when operating in a drop state, in accordance with an aspect of the disclosure.

FIG. 6 shows a method performed by the scheduler when operating in the drop state (4). The drop state is entered at block 602, such as after it was determined that the dropped packet condition was triggered. At decision block 604, a determination is made whether packets are being dropped at the port of the hardware interface. If the determination at block 604 is YES, the scheduler remains in the drop state (3) and the scheduler's cycle is completed at block 608. If the determination at block 604 is NO, the method continues at block 606 for switching the state machine to the previous throughput state in accordance with the hierarchy of throughput states, which in the example shown is the Rx buffer filled state (3), after which the scheduler's cycle is completed at block 608.

The state machine of the scheduler minimizes monitoring for the Rx driver queue filled condition because this condition can use multiple different thresholds, thus requiring more complex calculations. The state machine is configured so that the Rx driver queue filled condition is only checked when in certain states (e.g., receive packet state (1) and Rx driver queue filled state (2)). Additionally, the Rx driver queue filled condition is checked last, that is after checking for other conditions (e.g., dropped packets and Rx buffer filled conditions) that are simpler to monitor.

Figure 7:
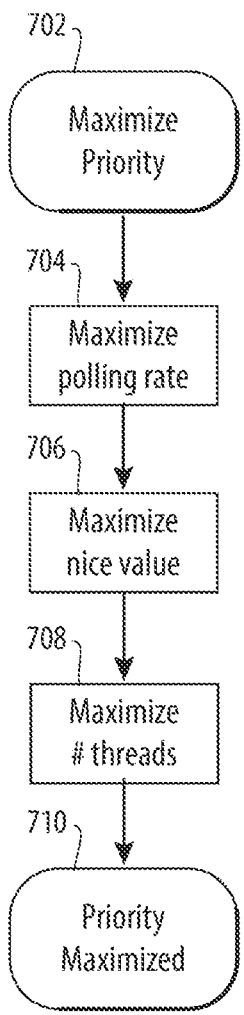
FIG. 7 is a flowchart showing an example method performed by the scheduler for causing priority to be maximized by the scheduler when the scheduler escalates to maximum priority due to a worst-case scenario, in accordance with an aspect of the disclosure.

FIG. 7 shows a method of causing priority to be maximized by the scheduler, which is performed when the scheduler escalates to maximum priority due to a worst-case scenario, e.g., detection of dropped packets. The maximize priority operation is started at block 702, such as after it was determined that the dropped packet condition was triggered (e.g., at blocks 320, 420, and 520 in FIGS. 3, 4, and 5, respectively). At block 704, a polling rate is maximized, at block 706 a nice value is maximized, and at block 708 the maximum number of poll threads is maximized. At block 710 the method of maximizing the priority is ended.

Figure 8:
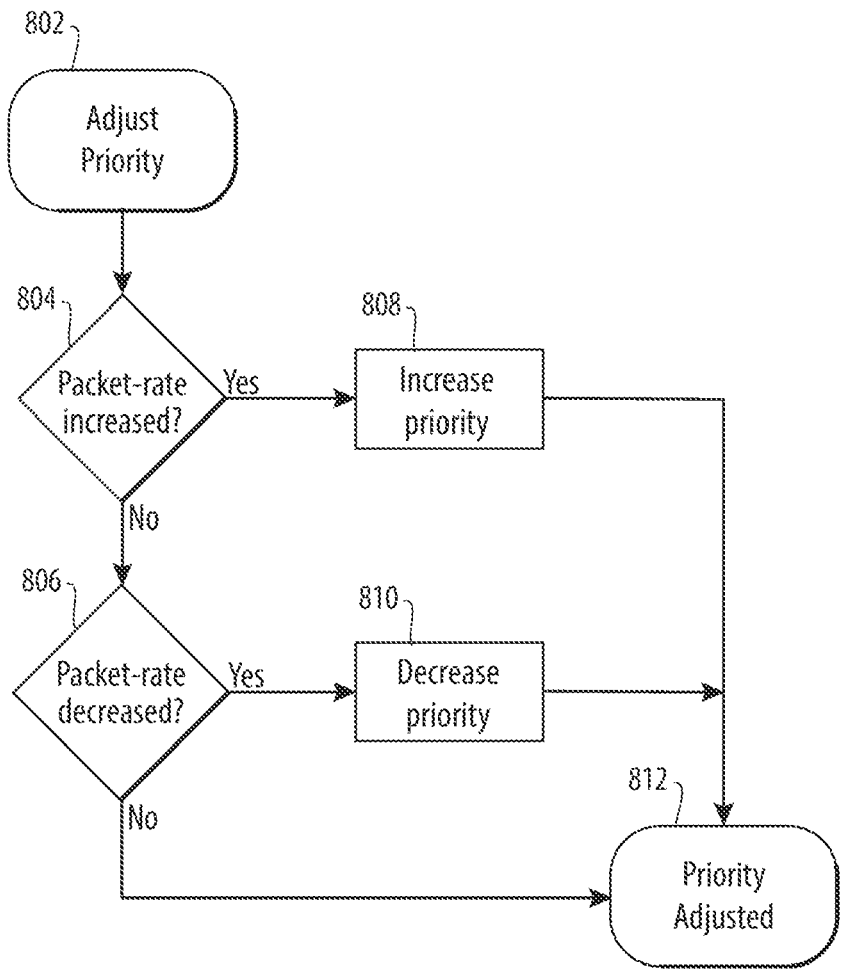
FIG. 8 is a flowchart showing an example method performed by the scheduler for of adjusting priorities, in accordance with an aspect of the disclosure.

FIG. 8 shows a method of adjusting priority by the scheduler. The adjust priority operation is started at block 802, such as after calculating the interval packet rate (e.g., at blocks 314, 412, and 510 in FIGS. 3, 4, and 5, respectively). At decision blocks 804 and 806 it is determined, respectively, whether the packet rate has increased or decreased since the previous polling interval. If it is determined at block 804 that the packet rate is to be has increased, the priority is increased at block 808. If it is determined at block 806 that the packet rate has decreased, the priority is decreased at block 810. At block 812, the method of adjusting the priority is ended.

Figure 9:
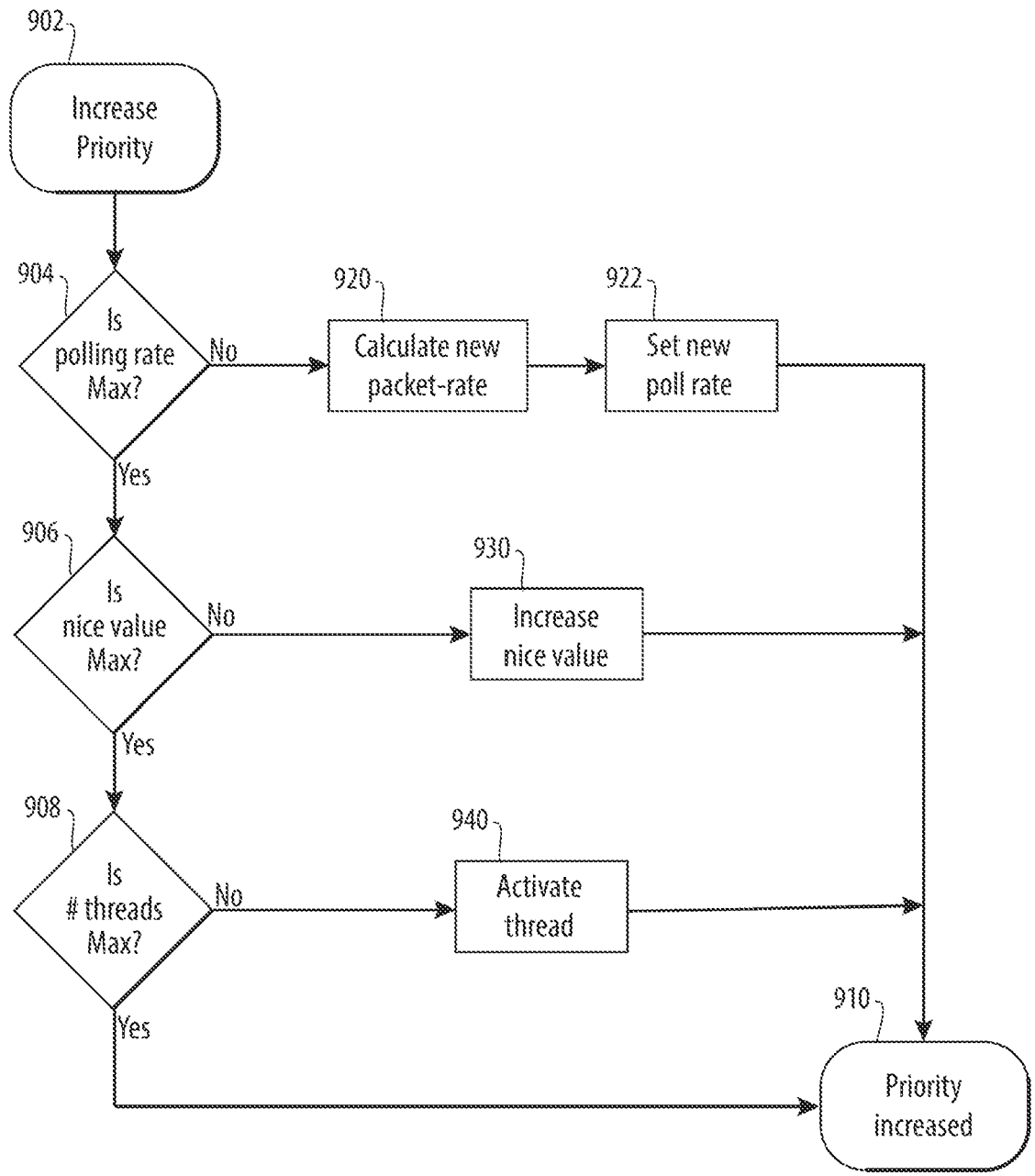
FIG. 9 is a flowchart showing an example method performed by the scheduler for of increasing priority, in accordance with an aspect of the disclosure.

FIG. 9 shows a method of increasing priority by the scheduler. The increase priority operation is started at block 902, such as after determining that the priority is to be increased (e.g., at blocks 330 and 340 of FIG. 3, block 430 of FIG. 4, and block 808 of FIG. 8). At decision blocks 904, it is determined whether the polling rate is already set to a maximum rate. If it is determined at decision block 904 that the polling rate is set to the maximum rate, the method continues at decision block 906. At decision blocks 906, it is determined whether the nice value is already set to a maximum value. If it is determined at decision block 906 that the nice value is set to the maximum value, the method continues at decision block 908. At decision blocks 908, it is determined whether the number of allocated poll threads is already set to a maximum number of poll threads. If it is determined at decision block 908 that the number of allocated poll threads is set to the maximum number, the method of increasing priority ends at block 910.

If it is determined at decision block 904 that the polling rate is not set to the maximum rate, the method continues at block 920. At block 920 a new polling rate is calculated. At block 922 the new polling rate is set, after which the method of increasing priority ends at block 910.

If it is determined at decision block 906 that the nice value is not set to the maximum value, the method continues at block 930. At block 930 the nice value is increased (e.g., incremented by a predetermined amount, such as incremented by one, but without limitation to one), after which the method of increasing priority ends at block 910.

If it is determined at decision block 908 that the number of allocated poll threads is not set to the maximum number, the method continues at block 940. At block 940 a predetermined number of poll threads are activated (e.g., one poll thread, but without limitation to one), after which the method of increasing priority ends at block 910.

Figure 10:
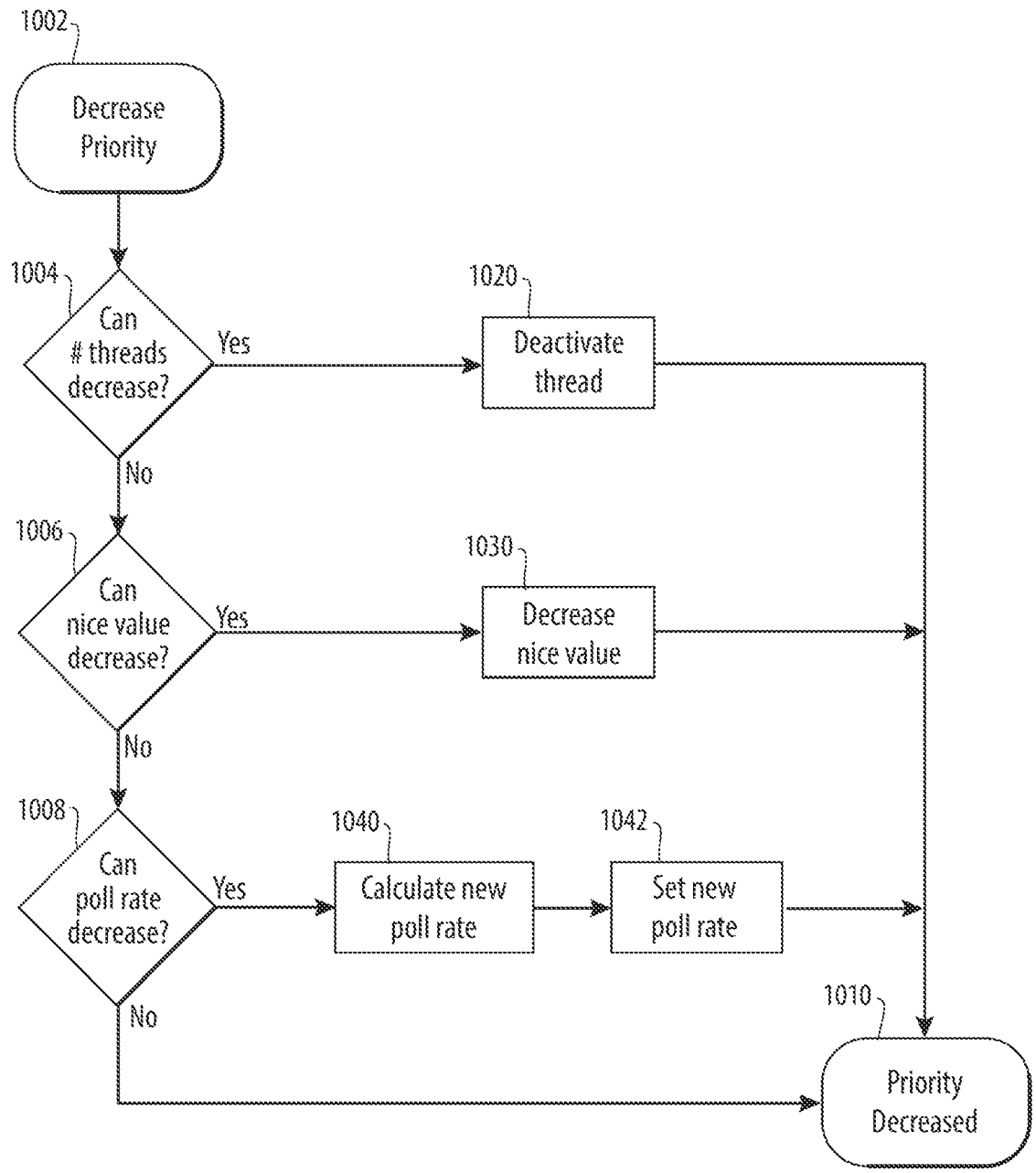
FIG. 10 is a flowchart showing an example method performed by the scheduler for of increasing priority, in accordance with an aspect of the disclosure.

FIG. 10 shows a method of decreasing priority by the scheduler. The decrease priority operation is started at block 1002, such as after determining that the priority is to be decreased (e.g., at block 810 of FIG. 8). At decision blocks 1004, it is determined whether the number of allocated poll threads can be decreased. If it is determined at decision block 1004 that the number of allocated poll threads cannot be decreased, the method continues at decision block 1006. At decision blocks 1006, it is determined whether the nice value can be decreased. If it is determined at decision block 1006 that the nice value cannot be decreased, the method continues at decision block 1008. At decision blocks 1008, it is determined whether the polling rate can be decreased. If it is determined at decision block 1008 that the polling rate cannot be decreased, the method of decreasing priority ends at block 1010.

If it is determined at decision block 1004 that the number of allocated poll threads can be decreased, the method continues at block 1020. At block 1020 one or more poll threads is deactivated, after which the method of decreasing priority ends at block 1010.

If it is determined at decision block 1006 that the nice value can be decreased, the method continues at block 1030. At block 1030 the nice value is decreased (e.g., decremented by a predetermined amount, such as decremented by one, but without limitation to one), after which the method of decreasing priority ends at block 1010.

If it is determined at decision block 1008 that the polling rate can be decreased, the method continues at block 1040. At block 1040 a new polling rate is calculated. At block 1042 the new polling rate is set, after which the method of decreasing priority ends at block 1010.

Adaptive polling driver 140 depicted in FIG. 1 thus optimizes allocation of poll threads and use of one or more cores of physical or virtual CPUs. This is beneficial for applications that run on single cores a limited number of cores, and applications that need to share one or more cores with other applications. Adaptive polling driver 140 can recognize when receive traffic throughput is low or high per hardware interface and increase or decrease the number of poll threads allocated per individual hardware interface based on the receive traffic throughput, thus freeing up CPU cores when not needed for poll threads due to low or decreased receive traffic throughput.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of computing system 100 may be implemented or executed by one or more computer systems. For example, computing system 100 can be implemented using an example architecture shown for computer system 1100 illustrated in FIG. 11. In various embodiments, computer system 1100 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1100 is only one example of a suitable system and is not intended to suggest any limitation as to the scope of use or functionality of embodiments of the disclosure described herein. Regardless, computer system 1100 is capable of being implemented and/or performing any of the functionality set forth hereinabove.

Computer system 1100 may be described in the general context of computer system-executable instructions, such as program modules, being executed by a computer system. Generally, program modules may include routines, programs, objects, components, logic, data structures, and so on that perform particular tasks or implement particular abstract data types. Computer system 1100 may be practiced in distributed data processing environments where tasks are performed by remote processing devices that are linked through a communications network. In a distributed data processing environment, program modules may be located in both local and remote computer system storage media including memory storage devices.

Computer system 1100 is shown in FIG. 11 in the form of a general-purpose computing device. The components of computer system 1100 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1100 typically includes a variety of computer system readable media. Such media may be any available media that is accessible by computer system 1100, and it includes both volatile and non-volatile media, removable and non-removable media.

System memory 1128 can include computer system readable media in the form of volatile memory, such as random access memory (RAM) 1130 and/or cache memory 1132. Computer system 1100 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the disclosure.

Program/utility 1140, having a set (at least one) of program modules 1115, may be stored in memory 1128. By way of example, and not limitation, program modules can include an operating system, one or more application programs, other program modules, and program data. Each of the operating system, one or more application programs, other program modules, and program data or some combination thereof, may include an implementation of a networking environment. Program modules 1115 generally carry out the functions and/or methodologies of embodiments of the disclosure as described herein.

Computer system 1100 may also communicate with one or more external devices 1114 such as a keyboard, a pointing device, a display 1124, etc.; one or more devices that enable a user to interact with computer system 1100; and/or any devices (e.g., network card, modem, etc.) that enable computer system 1100 to communicate with one or more other computing devices. Such communication can occur via Input/Output (I/O) interfaces 1122. Still yet, computer system 1100 can communicate with one or more networks such as a local area network (LAN), a general wide area network (WAN), and/or a public network (e.g., the Internet) via network adapter 1120. As depicted, network adapter 1120 communicates with the other components of computing system 100 via bus 1118. It should be understood that although not shown, other hardware and/or software components could be used in conjunction with computer system 1100. Examples, include, but are not limited to: microcode, device drivers, redundant processing units, external disk drive arrays, RAID systems, tape drives, and data archival storage systems, etc.

Additionally, polling engine 148 of FIG. 1 can be implemented or executed by one or more internal computer systems, which can also be configured like a simple computer system 1100, wherein polling engine 148 is included within user space 130 of computing system 100.

The components of computer system 1100 may include, but are not limited to, one or more processors or processing units 1116, a system memory 1128, and an appropriate bus 1118 that couples various system components including system memory 1128 to processor 1116. In this implementation, network adapter can be omitted, and I/O interface(s) are configured to communicate with other hardware and/or software components of computing system 100, such as Rx driver queue 142, API 150, Rx application buffer 144, and register 166.

Bus 1118 in this configuration can represent one or more of any of several types of bus structures, including a memory bus or memory controller and/or a processor or local bus using any of a variety of bus architectures. System memory 1128 can include computer system readable media in the form of volatile memory, such as random access memory (RAM) 1130 and/or cache memory 1132. Computer system 1100 may further include other volatile and/or non-volatile computer system storage media. Memory 1128 may include at least one program product having a set (e.g., at least one) of program modules that are configured to carry out the functions of embodiments of the disclosure, such as program/utility 1140, having a set (at least one) of program modules 1115. Program utility 140 and program modules 1115 can include, by way of example, and not limitation, program modules and program data to generally carry out the functions and/or methodologies of embodiments of the disclosure as described herein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

We claim:

1. A method implemented in a processor having kernel space and user space, the method comprising:
  receiving in the user space at least one interface statistic about each hardware interface of one or more hardware interfaces receiving packets, wherein the at least one interface statistic is provided from the hardware interface; and
  dynamically adjusting, from within the user space, a priority at which each of the one or more hardware interfaces is polled as a function of the at least one interface statistic, wherein dynamically adjusting the priority for a particular hardware interface of the one or more hardware interfaces includes changing between states of a state machine, including:
    entering and remaining in a drop state while a dropped packet condition is detected and checking for dropped packets while in the drop state, wherein changing between states of the state machine includes:

entering and remaining in a receive (Rx) buffer filled state while an Rx buffer filled condition is detected and a dropped packet condition is not detected for the hardware interface, wherein the Rx buffer filled condition is a function of fill status of an Rx buffer in the hardware interface as reported to the kernel space; and checking for the dropped packet condition and the Rx buffer filled condition while in the Rx buffer filled state.

2. The method of claim 1, wherein the priority of the hardware interface is maximized when entering the drop state.

3. The method of claim 1, wherein while the Rx buffer filled condition is detected for the hardware interface, the priority of the hardware interface is adjusted based on a calculated interval packet rate of the hardware interface.

4. The method of claim 1, wherein changing between states of the state machine further includes:

entering and remaining in an Rx driver queue filled state while an Rx driver queue filled condition is detected and Rx buffer filled and dropped packet conditions are not detected for the hardware interface, wherein the Rx driver queue filled condition is a function of fill status of a receive queue established by Direct Access Memory (DMA) transfer from the hardware interface; and checking for the dropped packet condition and the Rx driver queue filled condition while in the Rx buffer filled state.

5. The method of claim 4, wherein, checking for the dropped packet condition is performed before checking for the Rx driver queue filled condition, and/or while the Rx driver queue filled condition is detected for the hardware interface, the priority of the hardware interface is adjusted based on a calculated interval packet rate of the hardware interface.

6. The method of claim 4, wherein changing between states of the state machine further includes:

entering and remaining in a packet receiving state when the hardware interface is receiving packets and Rx driver queue filled, Rx buffer filled, and dropped packet conditions are not detected for the hardware interface, wherein while in the packet receiving state, the priority of the hardware interface is adjusted based on a calculated interval packet rate of the hardware interface.

7. The method of claim 4, wherein, checking for the dropped packet condition is performed before checking for the Rx buffer filled condition, and checking for the Rx buffer filled condition is performed before checking for the Rx driver queue filled condition, and/or the priority is increased or decreased when changing to the Rx buffer filled state or the Rx driver queue filled state and the priority is maximized when changing to the drop state.

8. The method of claim 4, wherein changing between states of the state machine further includes:

entering and remaining in an idle state when the hardware interface is not receiving packets, wherein the idle state includes refraining from monitoring for Rx driver queue filled, Rx buffer filled, and dropped packet conditions.

9. A method implemented in a processor having kernel space and user space, the method comprising:

receiving in the user space at least one interface statistic about each hardware interface of one or more hardware interfaces receiving packets, wherein the at least one interface statistic is provided from the hardware interface; and dynamically adjusting, from within the user space, a priority at which each of the one or more hardware interfaces is polled as a function of the at least one interface statistic, wherein adjusting the priority includes:

maximizing the priority when a dropped packet condition is detected, and maximizing the priority includes maximizing a polling rate for polling the hardware interface, maximizing a nice value associated with the hardware interface, and maximizing a number of poll threads to allocate for the hardware interface; or adjusting the priority when Rx driver queue filled or Rx buffer filled conditions are detected, wherein adjusting the priority includes activating or deactivating one or more poll threads for the hardware interface, increasing or decreasing a nice value associated with the hardware interface, and increasing or decreasing a polling rate for polling the hardware interface.

10. A processor having kernel space and user space and a polling engine in the user space, the polling engine comprising:

at least one memory configured to store instructions; and
at least one processing device disposed in communication with the at least one memory, wherein the at least one processing device upon execution of the instructions is configured to:

receive at least one interface statistic about each hardware interface of one or more hardware interfaces receiving packets, wherein the at least one interface statistic is provided from the hardware interface;

dynamically adjust, from within the user space, a priority at which each of the one or more hardware interfaces is polled as a function of the at least one interface statistic;

dynamically adjust the priority for a particular hardware interface of the one or more hardware interfaces by changing between states of a state machine, including entering and remaining in a drop state while a dropped packet condition is detected and checking for dropped packets while in the drop state; and change between states of the state machine by:
entering and remaining in a receive (Rx) buffer filled state while an Rx buffer filled condition is detected and a dropped packet condition is not detected for the hardware interface, wherein the Rx buffer filled condition is a function of fill status of an Rx buffer in the hardware interface as reported to the kernel space; and checking for the dropped packet condition and the Rx buffer filled condition while in the Rx buffer filled state.

11. The processor of claim 10, wherein the priority of the hardware interface is maximized when entering the drop state.

12. The processor of claim 10, wherein while the Rx buffer filled condition is detected for the hardware interface, the at least one processing device upon execution of the instructions is further configured to adjust priority of the hardware interface based on a calculated interval packet rate of the hardware interface.

13. The processor of claim 10, wherein the at least one processing device upon execution of the instructions is further configured to change between states of the state machine by:
    entering and remaining in an Rx driver queue filled state while an Rx driver queue filled condition is detected and Rx buffer filled and dropped packet conditions are not detected for the hardware interface, wherein the Rx driver queue filled condition is a function of fill status of a receive queue established by Direct Access Memory (DMA) transfer from the hardware interface; and
    checking for the dropped packet condition and the Rx driver queue filled condition while in the Rx buffer filled state.

14. The processor of claim 13, wherein,
    the at least one processing device upon execution of the instructions is further configured to check for the dropped packet condition before checking for the Rx driver queue filled condition, and/or
    while the Rx driver queue filled condition is detected for the hardware interface, the at least one processing device upon execution of the instructions is further configured to adjust priority of the hardware interface based on a calculated interval packet rate of the hardware interface.

15. The processor of claim 13, wherein the at least one processing device upon execution of the instructions is further configured to change between states of the state machine further by entering and remaining in a packet receiving state when the hardware interface is receiving packets and Rx driver queue filled, Rx buffer filled, and dropped packet conditions are not detected for the hardware interface, wherein while in the packet receiving state, the at least one processing device upon execution of the instructions is further configured to adjust priority of the hardware interface based on a calculated interval packet rate of the hardware interface.

16. The processor of claim 13, wherein,
    the at least one processing device upon execution of the instructions is further configured to check for the dropped packet condition before checking for the Rx buffer filled condition, and to check for the Rx buffer filled condition before checking for the Rx driver queue filled condition, and/or
    the at least one processing device upon execution of the instructions is further configured to increase or decrease the priority when changing to the Rx buffer filled state or the Rx driver queue filled state and to maximize the priority when changing to the drop state.

17. The processor of claim 13, wherein the at least one processing device upon execution of the instructions is further configured to change between states of the state machine further by:
    entering and remaining in an idle state when the hardware interface is not receiving packets, wherein the idle state includes refraining from monitoring for Rx driver queue filled, Rx buffer filled, and dropped packet conditions.

18. The processor of claim 10, wherein the at least one processing device upon execution of the instructions is further configured to adjust the priority by:
    maximizing the priority when a dropped packet condition is detected, and maximizing the priority includes maximizing a polling rate for polling the hardware interface, maximizing a nice value associated with the hardware interface, and maximizing a number of poll threads to allocate for the hardware interface; or
    adjusting the priority when Rx driver queue filled or Rx buffer filled conditions are detected, wherein adjusting the priority includes activating or deactivating one or more poll threads for the hardware interface, increasing or decreasing a nice value associated with the hardware interface, and increasing or decreasing a polling rate for polling the hardware interface.

19. A non-transitory computer readable storage medium and one or more computer programs embedded therein is provided, which when executed by a computer system, cause the computer system to:
    receive at least one interface statistic about each hardware interface of one or more hardware interfaces receiving packets, wherein the at least one interface statistic is provided from the hardware interface; and
    dynamically adjust, from within the user space, a priority at which each of the one or more hardware interfaces is polled as a function of the at least one interface statistic, wherein dynamically adjusting the priority for a particular hardware interface of the one or more hardware interfaces includes changing between states of a state machine, including:
        entering and remaining in a drop state while a dropped packet condition is detected and checking for dropped packets while in the drop state, wherein changing between states of the state machine includes:
            entering and remaining in a receive (Rx) buffer filled state while an Rx buffer filled condition is detected and a dropped packet condition is not detected for the hardware interface, wherein the Rx buffer filled condition is a function of fill status of an Rx buffer in the hardware interface as reported to the kernel space; and
            checking for the dropped packet condition and the Rx buffer filled condition while in the Rx buffer filled state.

20. The non-transitory computer readable storage of claim 19, wherein the priority of the hardware interface is maximized when entering the drop state.

21. The non-transitory computer readable storage of claim 19, wherein while the Rx buffer filled condition is detected for the hardware interface, the priority of the hardware interface is adjusted based on a calculated interval packet rate of the hardware interface.

22. The non-transitory computer readable storage of claim 19, wherein changing between states of the state machine further includes:
    entering and remaining in an Rx driver queue filled state while an Rx driver queue filled condition is detected and Rx buffer filled and dropped packet conditions are not detected for the hardware interface, wherein the Rx driver queue filled condition is a function of fill status of a receive queue established by Direct Access Memory (DMA) transfer from the hardware interface; and
    checking for the dropped packet condition and the Rx driver queue filled condition while in the Rx buffer filled state.

\* \* \* \* \*